United States Patent
Mitteer et al.

(10) Patent No.: US 10,267,417 B2
(45) Date of Patent: Apr. 23, 2019

(54) SHIFTER WITH NOISELESS BITSI SHIFT LEVER CONTROL

(71) Applicant: GHSP, Inc., Grand Haven, MI (US)

(72) Inventors: David Michael Mitteer, Shelby, MI (US); Jeffrey Lee Bays, Grand Haven, MI (US); Bradley John Vecellio, Spring Lake, MI (US)

(73) Assignee: GHSP, Inc., Grand Haven, MI (US)

( * ) Notice: Subject to any disclaimer, the term of this patent is extended or adjusted under 35 U.S.C. 154(b) by 143 days.

(21) Appl. No.: 15/238,168

(22) Filed: Aug. 16, 2016

(65) Prior Publication Data

US 2017/0059039 A1    Mar. 2, 2017

Related U.S. Application Data

(60) Provisional application No. 62/209,936, filed on Aug. 26, 2015.

(51) Int. Cl.
*F16H 61/22* (2006.01)
*F16H 59/10* (2006.01)
*F16H 59/02* (2006.01)

(52) U.S. Cl.
CPC ......... *F16H 61/22* (2013.01); *F16H 59/0278* (2013.01); *F16H 59/10* (2013.01); *F16H 2059/0282* (2013.01); *F16H 2061/223* (2013.01)

(58) Field of Classification Search
None
See application file for complete search history.

(56) References Cited

U.S. PATENT DOCUMENTS

| 5,275,065 A | 1/1994 | Ruiter |
| 5,379,871 A | 1/1995 | Asano et al. |

(Continued)

FOREIGN PATENT DOCUMENTS

| JP | 8216722 | 8/1996 |
| JP | 2002362179 | 12/2002 |
| WO | 2008006021 A2 | 1/2008 |

OTHER PUBLICATIONS

International Search Report and Written Opinion of the International Searching Authority, or the Declaration; International Application No. PCT/US2016/047753; dated Dec. 8, 2016; 9 pages.

*Primary Examiner* — Jacob S. Scott
*Assistant Examiner* — Lori Wu
(74) *Attorney, Agent, or Firm* — Price Heneveld LLP

(57) ABSTRACT

A transmission shifter includes a base, a shift lever movable between gear positions, and a pawl, a pawl blocker, a permanent magnet, an electro-magnet, and an electrical circuit for selectively activating the electro-magnet when a predetermined vehicle condition is sensed. The permanent magnet's attraction to an iron based surface of the electro-magnet normally holds the blocker in a pawl-blocking position, keeping the shift lever in park position, until the electrical circuit activates the electro-magnet and the pawl is depressed. When activated, the electro-magnet biases the blocker toward a pawl-unblocked position. A ramp lever keeps the pawl blocker in the park position until the pawl mechanically moves the ramp lever and magnetically-biased blocker together, thus allowing the shift lever to be moved from park position. The park lock system is characterized by an absence of movement in response to an electrical signal to an electro-mechanical device and thus operates noise-free.

6 Claims, 5 Drawing Sheets

(56) References Cited

U.S. PATENT DOCUMENTS

| | | | |
|---|---|---|---|
| 5,421,792 | A | 6/1995 | Kataumi et al. |
| 5,490,585 | A | 2/1996 | Togano |
| 5,494,141 | A | 2/1996 | Osborn |
| 5,662,001 | A | 9/1997 | Smale |
| 6,209,408 | B1 | 4/2001 | DeJonge et al. |
| 6,298,742 | B1 | 10/2001 | Ey |
| 6,852,065 | B2 | 2/2005 | Yamada et al. |
| 6,991,582 | B2 | 1/2006 | Segeler |
| 7,677,128 | B2 | 3/2010 | Shimizu et al. |
| 8,613,236 | B2 | 12/2013 | Ito |
| 8,726,755 | B2 | 5/2014 | Nakamura et al. |
| 8,729,993 | B2 | 5/2014 | Ito et al. |
| 8,978,504 | B2 | 3/2015 | Morimura |
| 2001/0049574 | A1 | 12/2001 | Taniguchi et al. |
| 2008/0217123 | A1 | 9/2008 | Fujita |
| 2009/0025501 | A1 | 1/2009 | Mitteer |
| 2009/0043465 | A1 | 12/2009 | Tomita |
| 2010/0048352 | A1 | 2/2010 | Yamamoto |
| 2010/0049574 | A1 | 2/2010 | Paul et al. |
| 2011/0130910 | A1 | 6/2011 | Kanai et al. |
| 2013/0332019 | A1 | 12/2013 | Goto et al. |
| 2014/0000403 | A1* | 1/2014 | Kim ................. F16H 61/22 74/473.21 |
| 2015/0049574 | A1 | 2/2015 | Muntean et al. |
| 2015/0057126 | A1 | 2/2015 | Harada et al. |
| 2015/0362067 | A1* | 12/2015 | Mitteer ............. F16H 61/22 74/490.07 |

\* cited by examiner

SHIFTER WITH NOISELESS BITSI SHIFT LEVER CONTROL

CROSS-REFERENCE TO RELATED APPLICATION

This application claims benefit under 35 USC section 119(e) to U.S. Provisional Application No. 62/209,936, filed on Aug. 26, 2015, entitled TRANSMISSION SHIFTER WITH NOISELESS PARK LOCK, the entire disclosure of which is incorporated herein by reference.

BACKGROUND OF THE INVENTION

The present invention relates to transmission shifters having a park lock function that only allows shifting out of a park position when predetermined vehicle conditions are met, such as when a park brake pedal is depressed and an ignition switch turned "on" (sometimes called a "BITSI" which refers to "brake ignition transmission shift interlock"); and more particularly relates to shifters having a noiseless park lock function.

Modern vehicles require that a vehicle's transmission shifter can only be shifted out of a park position when predetermined vehicle conditions are met, such as that a park brake pedal is depressed and an ignition switch is turned to an "on" position. Many shifters incorporate a solenoid into an electrical circuit to accomplish this park lock function, with the solenoid operating to actively release the shifter from park only when sensors detect that the brake pedal is depressed and the ignition switch is on. However, active solenoids moving in response to an electrical signal create an audible "click" noise when they operate. As vehicles become increasingly quiet, including for example electric vehicles, vehicle owners may interpret the "click" noise as a vehicle defect. A park lock system is desired to overcome this "noise" concern, but that uses a minimum number of parts, is easy to assemble, is durable and robust, and that does not create any noise upon performing its function.

SUMMARY OF THE INVENTION

In one aspect of the present invention, a transmission shifter comprises a base defining a plurality of gear positions including a park position; a shift lever movably supported by the base for movement between the gear positions, a pawl on the shift lever operably selectively engaging the gear positions; and a park lock system. The park lock system includes a ramp lever and a blocker both movably supported on the base, and also includes a permanent magnet on the blocker and a corresponding electro-magnet on the base, and still further includes an electrical circuit for selectively activating the electro-magnet when a predetermined vehicle condition is sensed. The ramp lever has an under-pawl position and an out-from-under-pawl position, and includes an angled upper surface engaged when the pawl is operated to shift out of park position, and includes a bias spring biasing the ramp lever to the under-pawl position. The ramp lever is configured to abuttingly engage the blocker when the ramp lever is moved to the under-pawl position but not engage the blocker when the ramp lever is moved to the out-from-under-pawl position. The blocker has a pawl-blocking position and a pawl-unblocked position, and supports the permanent magnet near the electro-magnet when in the pawl-blocking position. A) When the shift lever is in the park position and the electrical circuit is not operating the electro-magnet and the pawl is not depressed, a bias spring biases the ramp lever and the blocker into the under-pawl position and pawl-blocking position, respectively, and hence the shift lever cannot be shifted out of the park position. B) When the shift lever is in the park position and the electrical circuit is not activating the electro-magnet and the pawl is depressed, the ramp lever is moved to the out-from-under-pawl position by the pawl, but the blocker remains in the pawl-blocking position such that the shift lever cannot be shifted out of the park position. C) When the shift lever is in the park position and the electrical circuit is activating the electro-magnet and the pawl is not depressed, the electro-magnet creates a magnetic force pressing the blocker against the ramp lever, but the magnetic force is less than the spring force of the bias spring such that the ramp lever and the blocker remain in the under-pawl position and pawl-blocking position, respectively. D) When the shift lever is in the park position and the electrical circuit is activating the electro-magnet and the pawl is depressed, the electro-magnet creates a magnetic force biasing the blocker toward the pawl-unblocked position and pressing the blocker against the ramp lever, and concurrently the ramp lever is moved by the pawl, such that both the blocker and the ramp lever move to the out-from-under-pawl position and pawl-unblocked position, respectively, thus allowing the shift lever to be moved from park position to another one of the gear positions.

In another aspect of the present invention, a transmission shifter comprises a base defining a plurality of gear positions including a park position; a shift lever movably supported by the base for movement between the gear positions and a pawl on the shift lever operably selectively engaging the gear positions; and a park lock system constructed to prevent moving the shift lever out of the park position until predetermined vehicle conditions are met. The park lock system includes a pawl blocker, a permanent magnet, an electro-magnet, and an electrical circuit for selectively activating the electro-magnet when a predetermined vehicle condition is sensed. The park lock system is characterized by an absence of an electro-mechanical device with movable member connected to the blocker for moving the blocker. A) When the shift lever is in the park position and the electrical circuit is not activating the electro-magnet and the pawl is depressed, the blocker prevents the pawl from being moved out of the park position. B) When the shift lever is in the park position and the electrical circuit is activating the electro-magnet and the pawl is depressed, the electro-magnet creates a magnetic force biasing the blocker toward a pawl-unblocked position which thus allows the shift lever to be moved from park position to another one of the gear positions.

In another aspect of the present invention, a transmission shifter comprises a base defining a plurality of gear positions including a park position; a shift lever movably supported by the base for movement between the gear positions and a pawl on the shift lever operably selectively engaging the gear positions; and a park lock system having a blocker constructed to prevent moving the shift lever out of the park position until predetermined vehicle conditions are met. The park lock system includes a magnetic arrangement for holding the blocker in a pawl-blocking position without movement of any component when the predetermined vehicle conditions are not met, and the magnetic arrangement biases the blocker to a pawl-unblocked position when the vehicle conditions are met.

In another aspect of the present invention, an improvement is provided for a transmission shifter having a base defining a plurality of gear positions including a park position; a shift lever movably supported by the base for movement between the gear positions and a pawl on the shift lever operably selectively engaging the gear positions; and a park lock system having a blocker constructed to prevent moving the shift lever out of the park position until predetermined vehicle conditions are met. The improvement comprises the park lock system including an electro-magnetic arrangement for holding the blocker in a pawl-blocking position without movement of any component when the predetermined vehicle conditions are not met, the electro-magnetic arrangement being configured to bias the blocker to a pawl-unblocked position when the vehicle conditions are met, the park lock system characteristically not including an electro-mechanical actuator with movable member for moving the blocker to a pawl-blocking position.

In another aspect of the present invention, a method of shifting a transmission shifter includes providing a base defining a plurality of gear positions including a park position; providing a shift lever movably supported by the base for movement between the gear positions and a pawl on the shift lever operably selectively engaging the gear positions; providing a park lock system including a ramp lever and a blocker both movably supported on the base, and also including a permanent magnet on the blocker and an corresponding electro-magnet on the base, and still further including an electrical circuit for selectively activating the electro-magnet when a predetermined vehicle condition is sensed; the ramp lever having an under-pawl position and an out-from-under-pawl position, and including an angled upper surface engaged when the pawl is operated to shift out of park position, and including a bias spring biasing the ramp lever to the under-pawl position, and configured to abuttingly engaging the blocker when the ramp lever is moved to the under-pawl position but not engage the blocker when the ramp lever is moved to the out-from-under-pawl position; and the blocker having a pawl-blocking position and a pawl-unblocked position, and supporting the permanent magnet near the electro-magnet when in the pawl-blocking position. The method includes steps of: A) when the shift lever is in the park position and the electrical circuit is not operating the electro-magnet and the pawl is not depressed, the bias spring biasing the ramp lever and the blocker into the under-pawl position and pawl-blocking position, respectively, and hence the shift lever cannot be shifted out of the park position; B) when the shift lever is in the park position and the electrical circuit is not activating the electro-magnet and the pawl is depressed, moving the ramp lever to the out-from-under-pawl position by the pawl, but keeping the blocker in the pawl-blocking position such that the shift lever cannot be shifted out of the park position; C) when the shift lever is in the park position and the electrical circuit is activating the electro-magnet and the pawl is not depressed, operating the electro-magnet to create a magnetic force pressing the blocker against the ramp lever, but with the magnetic force being less than the spring force of the bias spring such that the ramp lever and the blocker remain in the under-pawl position and pawl-blocking position, respectively; D) when the shift lever is in the park position and the electrical circuit is activating the electro-magnet and the pawl is depressed, operating the electro-magnet to create a magnetic force biasing the blocker toward the pawl-unblocked position and pressing the blocker against the ramp lever, and concurrently the ramp lever is moved by the pawl, such that both the blocker and the ramp lever move to the out-from-under-pawl position and pawl-unblocked position, respectively, thus allowing the shift lever to be moved from park position to another one of the gear positions.

An object of the present invention is to provide a pawl-blocking or shift-lever-blocking member that blocks movement of the shift lever out of park position without movement of a component that creates noise, and in particular without using a solenoid or electro-mechanical device with movable member that creates noise.

These and other aspects, objects, and features of the present invention will be understood and appreciated by those skilled in the art upon studying the following specification, claims, and appended drawings.

DETAILED DESCRIPTION OF PREFERRED EMBODIMENT

Figure 1:
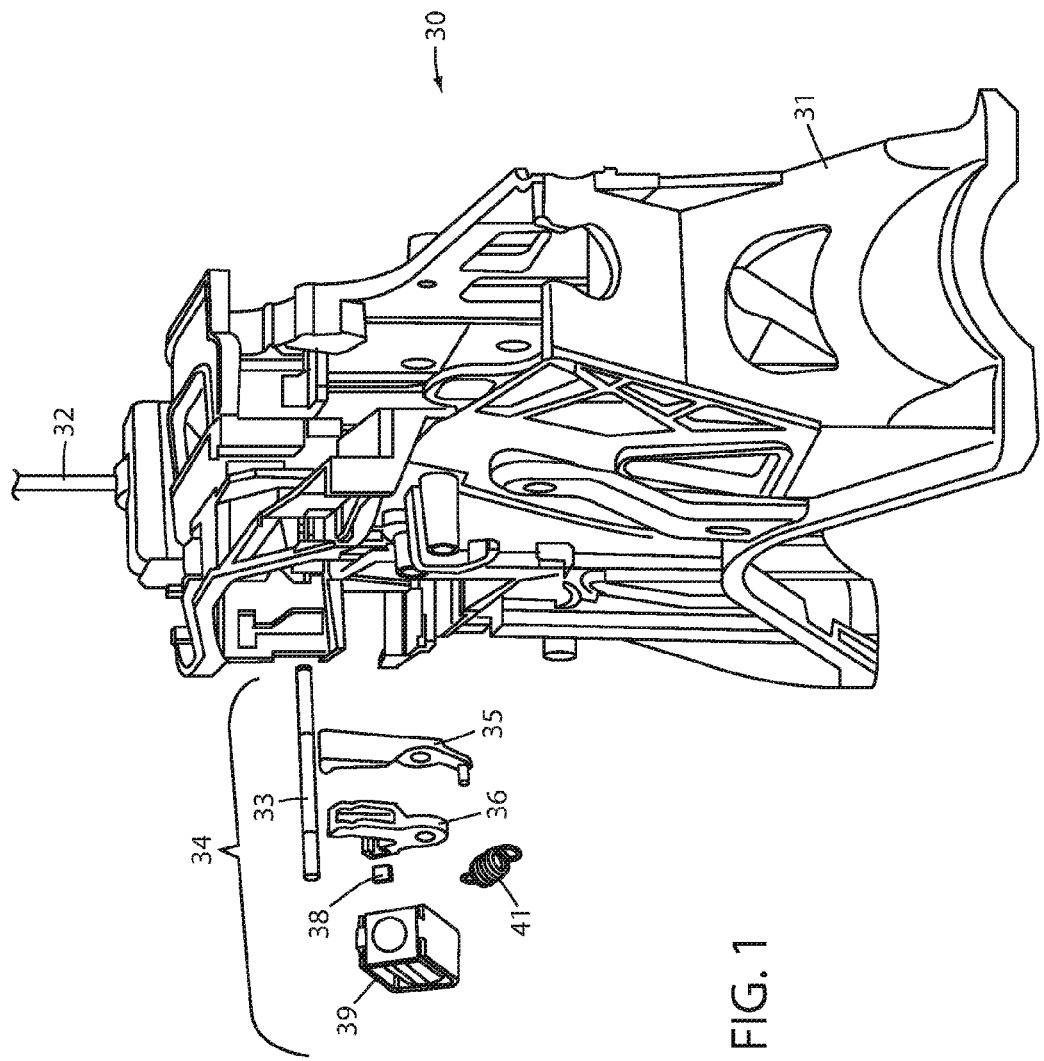
FIG. 1 is an exploded assembly of a shifter embodying the present invention.
Figure 2:
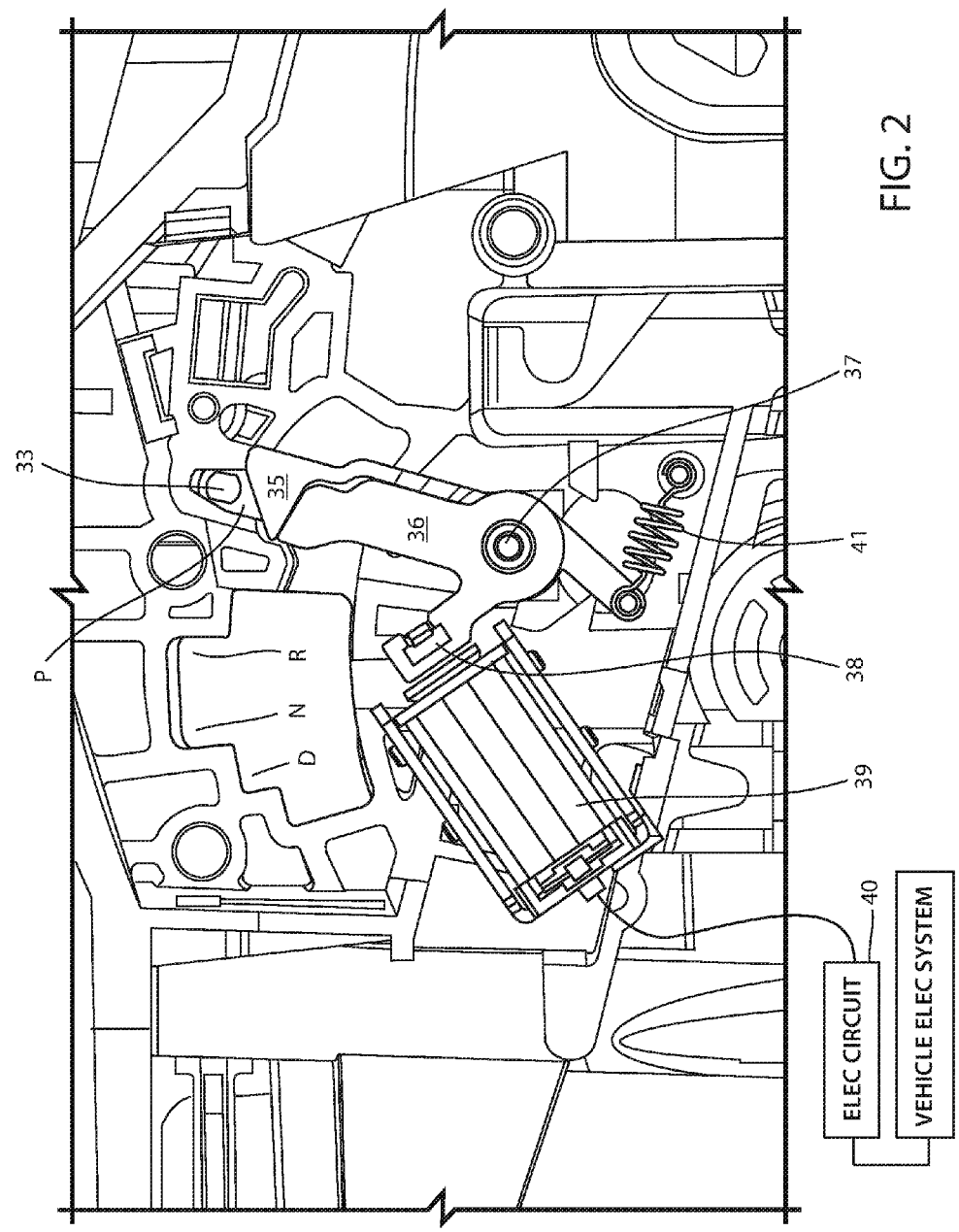
FIG. 2 is a side view of the shifter in FIG. 1, showing the BITSI system at rest with no pawl engagement and no electro-magnetic coil activation.
Figure 3:
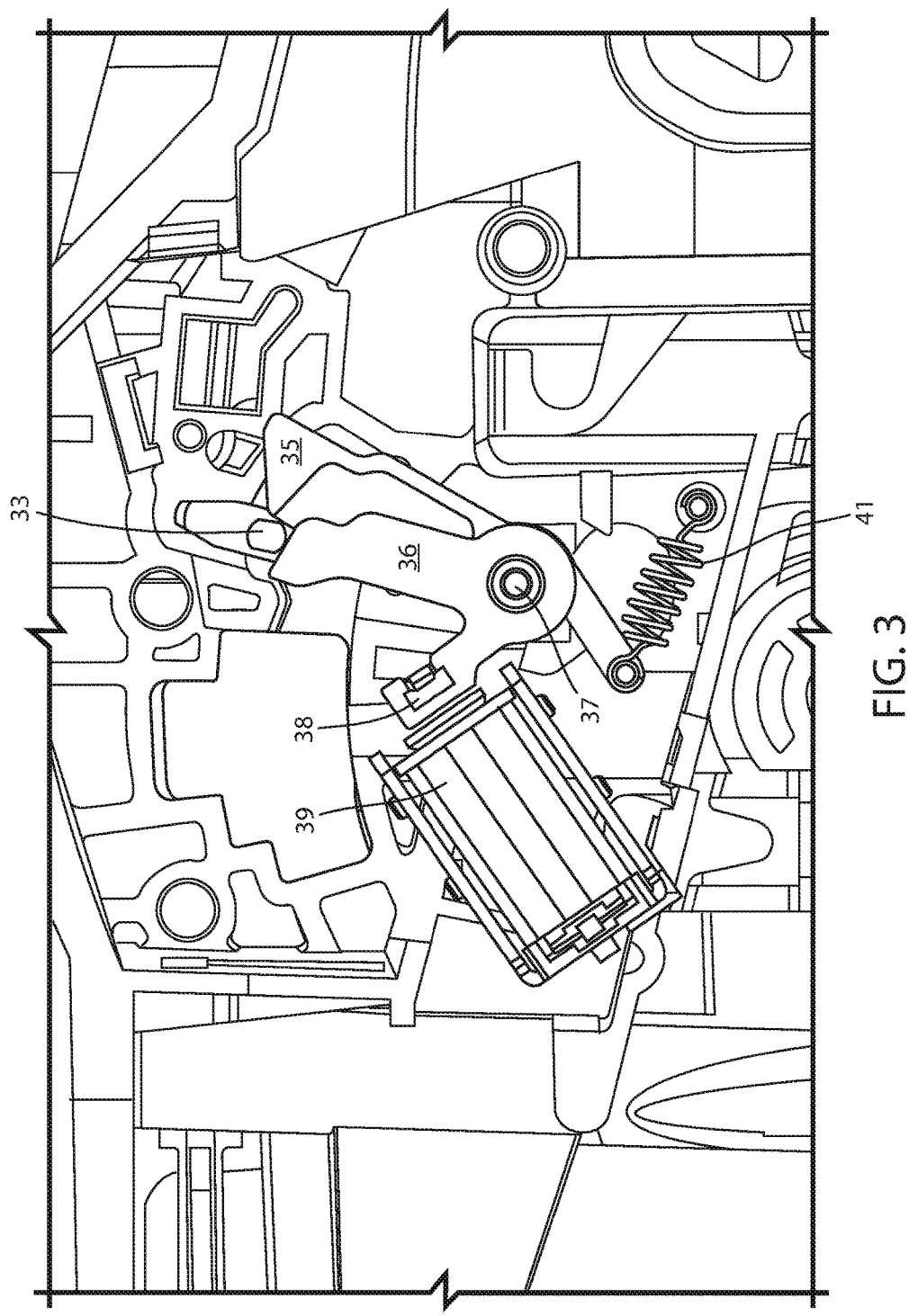
FIG. 3 is a side view of FIG. 2, showing the system during pawl block, where the pawl deflects a spring biased ramp lever but is stopped by a blocker and there is no coil activation.
Figure 4:
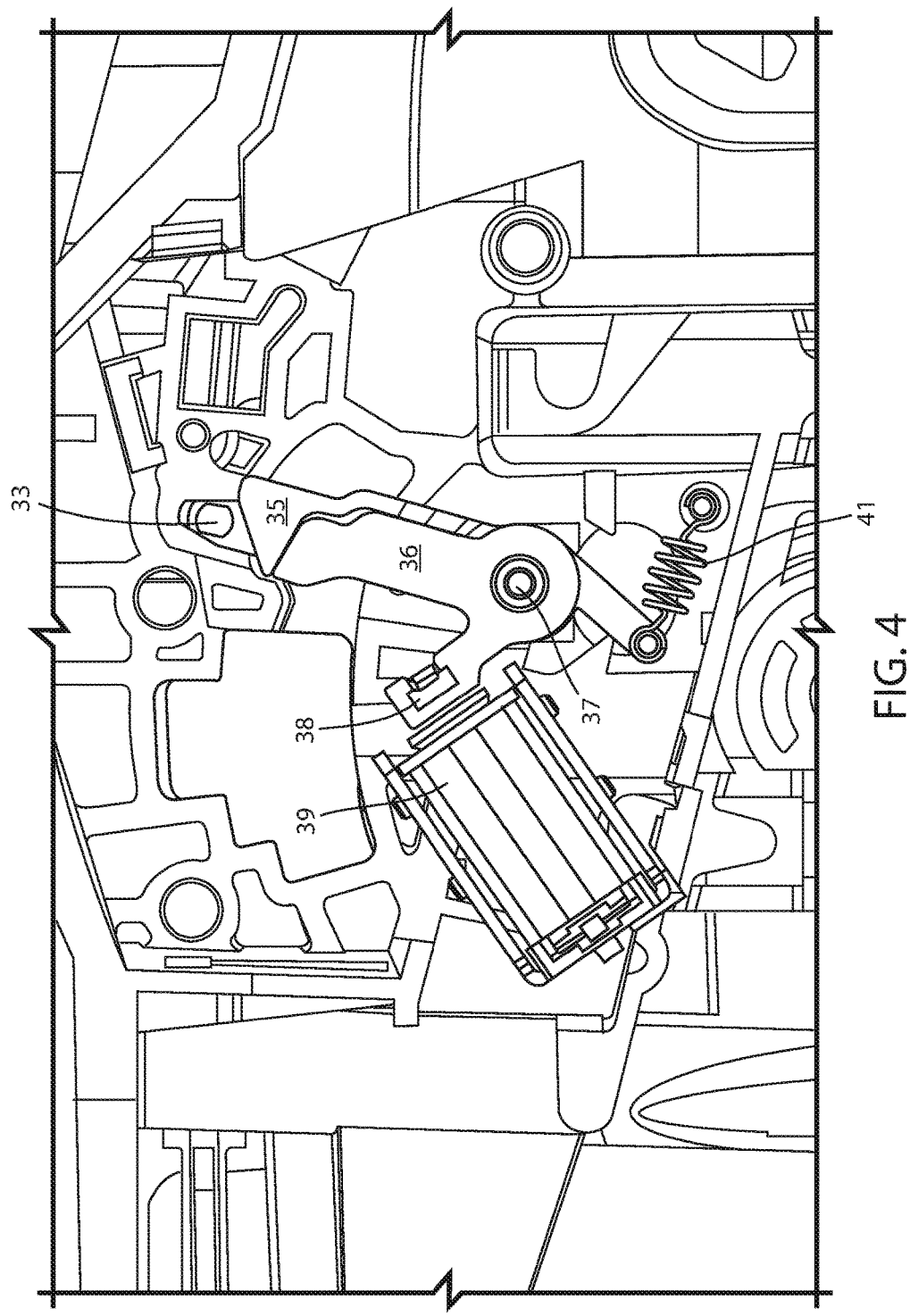
FIG. 4 is a side view of FIG. 2, showing the system during electro-magnetic coil activation, where the coil presses the blocker against the ramp lever with force less than that of the return spring, resulting in no movement of the blocker.
Figure 5:
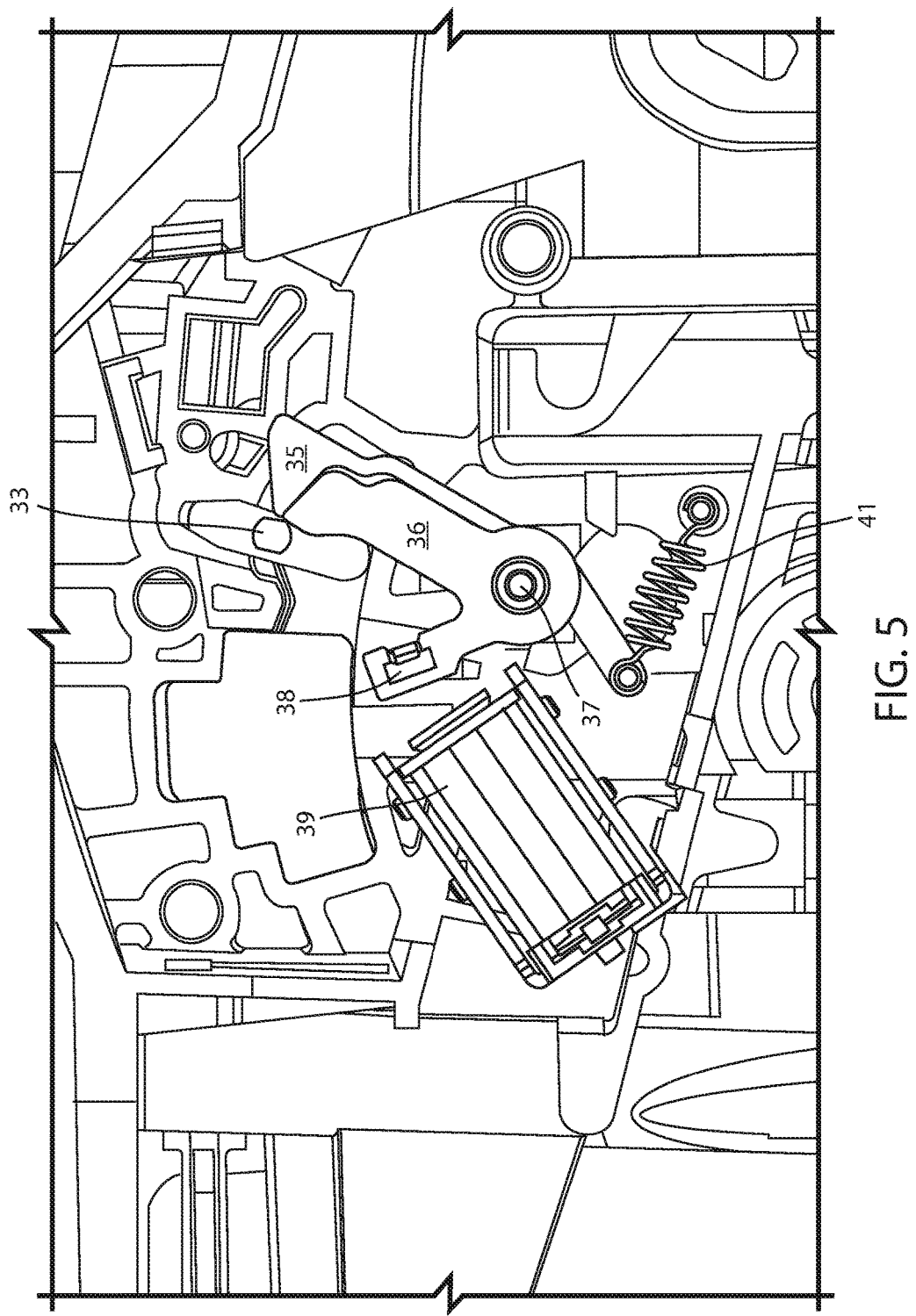
FIG. 5 is a side view of FIG. 1, showing the system during electro-magnetic coil activation and pawl engagement, where the coil presses the blocker against the ramp lever and the pawl deflects the lever ramp and the blocker as one allowing the pawl to pass out of the park position.

The present apparatus 30 (also called a "transmission shifter" or "shifter assembly" herein) comprises a base 31 with notched plate defining a plurality of gear positions P, R, N, D, (and potentially L or D1) including a park position P; a shift lever 32 movably supported by the base 31 for movement between the gear positions and a knob-button-operated pawl 33 on the shift lever 32 operably selectively engaging the gear positions; and a park lock system 34. The park lock system 34 includes a ramp lever 35 and a blocker 36 both pivotally movably supported on the base 31 by a common axle 37, and also includes a permanent magnet 38 on the blocker 36 and an corresponding electro-magnet 39 on the base 31. An electrical circuit 40 on the vehicle is operably connected to vehicle sensors on the vehicle for sensing depression of a brake pedal and for sensing that a vehicle ignition switch is in an "on" position. The circuit 40 is configured to selectively activate/power the electro-magnet 39 when a predetermined vehicle condition is sensed (i.e. the brake pedal is depressed and the ignition switch is "on"). The ramp lever 35 has an under-pawl position and an out-from-under-pawl position, and includes an angled upper surface 35A engaged when the pawl 33 is operated to shift out of park position, and includes a bias spring 41 biasing the ramp lever 35 to the under-pawl position. The ramp lever 35 is configured to abuttingly engaging the blocker 36 (i.e. not slide past) when the ramp lever 35 is moved to the under-pawl position, but not abuttingly engage the blocker 36 (i.e. allow separation) when the ramp lever 35 is moved away toward its out-from-under-pawl position. The blocker 36 has a pawl-blocking position and a pawl-unblocked position, and supports the permanent magnet 38 near the electro-magnet 39 when in the pawl-blocking position.

The shifter 30 and park lock system 34 operate as follows. A) When the shift lever 32 is in the park position P and the electrical circuit 40 is not operating/activating the electro-magnet 39 and the pawl 33 is not depressed, a bias spring 41 biases the ramp lever 35 and the blocker 36 (i.e. the ramp lever 35 is shaped to abut the blocker 36) into the under-pawl position and pawl-blocking position, respectively, and hence the shift lever 32 cannot be shifted out of the park position P. B) When the shift lever 32 is in the park position P and the electrical circuit 40 is not activating the electro-magnet 39 and the pawl 33 is depressed, the ramp lever 35 is moved to the out-from-under-pawl position by the pawl 33 sliding along the ramped top surface of the ramp lever 35, but the blocker 36 remains in the pawl-blocking position such that the shift lever 32 cannot be shifted out of the park position P. (It is noted that the electro-magnet 39 includes a magnetically-sensitive end piece, such that the permanent magnet 38 does provide a relatively small magnetic holding force that holds the blocker 36 in the pawl-blocking position when the electro-magnet 39 is not activated.) C) When the shift lever 32 is in the park position P and the electrical circuit 40 is activating the electro-magnet 39 and the pawl 33 is not depressed, the electro-magnet 39 creates a (repulsive) magnetic force pressing the blocker 36 against the ramp lever 35, but the magnetic force is less than the spring force of the bias spring 41 such that the ramp lever 35 and the blocker 36 remain in the under-pawl position and pawl-blocking position, respectively. D) When the shift lever 32 is in the park position P and the electrical circuit 40 is activating the electro-magnet 39 and the pawl 33 is depressed, the electro-magnet 39 creates a magnetic force biasing the blocker 36 toward the pawl-unblocked position and pressing the blocker 36 against the ramp lever 35, and concurrently the ramp lever 35 is moved by the pawl 33 (as the pawl 33 moves downward and engages and slides along the angled top surface of the ramp lever 35), such that both the blocker 36 and the ramp lever 35 move to the out-from-under-pawl position and pawl-unblocked position, respectively, thus allowing the shift lever 32 to be moved from park position P to another one of the gear positions. The park lock system 34 is characterized by an absence of an electro-mechanical device with moveable actuator member (such as a solenoid) to move the blocker, and thus operates noise-free.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. A transmission shifter comprising:
a base defining a plurality of gear positions including a park position;
a shift lever movably supported by the base for movement between the gear positions and a pawl on the shift lever operably selectively engaging the gear positions; and
a park lock system including a ramp lever and a blocker both movably supported on the base, and also including a permanent magnet on the blocker and an electro-magnet on the base, and still further including an electrical circuit for selectively activating the electro-magnet when a predetermined vehicle condition is sensed;
wherein:
the ramp lever having an under-pawl position and an out-from-under-pawl position, and including an angled surface engaged with the pawl when the pawl is operated to shift out of the park position, and the park lock system including a bias spring biasing the ramp lever to the under-pawl position, and the ramp lever configured to abuttingly engage the blocker when the ramp lever is moved to the under-pawl position but to not engage the blocker when the ramp lever is moved to the out-from-under-pawl position;
the blocker having a pawl-blocking position and a pawl-unblocked position, and supporting the permanent magnet near the electro-magnet when in the pawl-blocking position;
when the shift lever is in the park position, the electrical circuit is not operating the electro-magnet, and the pawl is not depressed, the bias spring biases the ramp lever and the blocker into the under-pawl position and pawl-blocking position, respectively, and hence the shift lever cannot be shifted out of the park position;
when the shift lever is in the park position, the electrical circuit is not activating the electro-magnet, and the pawl is depressed, the ramp lever is moved to the out-from-under-pawl position by the pawl, but the blocker remains in the pawl-blocking position such that the shift lever cannot be shifted out of the park position;
when the shift lever is in the park position, the electrical circuit is activating the electro-magnet, and the pawl is not depressed, the electro-magnet creates a magnetic force pressing the blocker against the ramp lever, but the magnetic force is less than a spring force of the bias spring such that the ramp lever and the blocker remain in the under-pawl position and pawl-blocking position, respectively; and
when the shift lever is in the park position, the electrical circuit is activating the electro-magnet, and the pawl is depressed, the electro-magnet creates the magnetic force biasing the blocker toward the pawl-unblocked position and pressing the blocker against the ramp lever, and concurrently the ramp lever is moved by the pawl, such that both the ramp lever and the blocker move to the out-from-under-pawl position and pawl-unblocked position, respectively, thus allowing the shift lever to be moved from the park position to another one of the gear positions.

2. A transmission shifter comprising:
a base defining a plurality of gear positions including a park position;
a shift lever movably supported by the base for movement between the gear positions and a pawl on the shift lever operably selectively engaging the gear positions; and
a park lock system constructed to prevent moving the shift lever out of the park position until predetermined vehicle conditions are met; the park lock system including a pawl blocker, a permanent magnet, an electro-magnet, and an electrical circuit for selectively activating the electro-magnet when a predetermined vehicle condition is sensed; the park lock system being characterized by an absence of an electro-mechanical device having a movable member connected to the blocker for moving the blocker;
wherein:
when the shift lever is in the park position and the electrical circuit is not activating the electro-magnet and the pawl is depressed, the blocker prevents the pawl from being moved out of the park position;
when the shift lever is in the park position and the electrical circuit is activating the electro-magnet and the pawl is depressed, the electro-magnet creates a magnetic force biasing the blocker toward a pawl-unblocked position which thus allows the shift lever to be moved from the park position to another one of the gear positions; and the park lock system further includes a ramp lever movable relative to the pawl blocker, the ramp lever having an angled surface engaged by the pawl when the pawl is operated, the ramp lever being configured to abuttingly engage the pawl blocker in a first direction biasing the pawl blocker toward the electro-magnet and including a bias device biasing the ramp lever in the first direction.

3. A transmission shifter comprising:

a base defining a plurality of gear positions including a park position;

a shift lever movably supported by the base for movement between the gear positions and a pawl on the shift lever operably selectively engaging the gear positions; and a park lock system having a blocker constructed to prevent moving the shift lever out of the park position until predetermined vehicle conditions are met, the park lock system including a magnetic arrangement for holding the blocker in a pawl-blocking position without movement of any component when the predetermined vehicle conditions are not met and where the magnetic arrangement biases the blocker to a pawl-unblocked position when the vehicle conditions are met, wherein the magnetic arrangement includes a permanent magnet and an electro-magnet, and the park lock system further includes a ramp lever movable relative to the pawl blocker, the ramp lever having an angled surface engaged by the pawl when the pawl is operated, the ramp lever being configured to abuttingly engage the pawl blocker in a first direction biasing the pawl blocker toward the electro-magnet and including a bias device biasing the ramp lever in the first direction.

4. The transmission shifter of claim 3, wherein the permanent magnet is mounted to the blocker and the electro-magnet is mounted on the base.

5. The transmission shifter of claim 4, wherein the blocker is a pawl blocker configured to abut the pawl and prevent undesired movement of the pawl.

6. A method of shifting a transmission shifter comprising:

providing a base defining a plurality of gear positions including a park position;

providing a shift lever movably supported by the base for movement between the gear positions and a pawl on the shift lever operably selectively engaging the gear positions;

providing a park lock system including a ramp lever and a blocker both movably supported on the base, and also including a permanent magnet on the blocker and an electro-magnet on the base, and still further including an electrical circuit for selectively activating the electro-magnet when a predetermined vehicle condition is sensed;

the ramp lever having an under-pawl position and an out-from-under-pawl position, and including an angled surface engaged with the pawl when the pawl is operated to shift out of the park position, and the park lock system including a bias spring biasing the ramp lever to the under-pawl position, and the ramp lever configured to abuttingly engage the blocker when the ramp lever is moved to the under-pawl position but not to engage the blocker when the ramp lever is moved to the out-from-under-pawl position;

the blocker having a pawl-blocking position and a pawl-unblocked position, and supporting the permanent magnet near the electro-magnet when in the pawl-blocking position;

when the shift lever is in the park position, the electrical circuit is not operating the electro-magnet, and the pawl is not depressed, the bias spring biasing the ramp lever and the blocker into the under-pawl position and pawl-blocking position, respectively, and hence the shift lever cannot be shifted out of the park position;

when the shift lever is in the park position, the electrical circuit is not activating the electro-magnet, and the pawl is depressed, moving the ramp lever to the out-from-under-pawl position by the pawl, but keeping the blocker in the pawl-blocking position such that the shift lever cannot be shifted out of the park position;

when the shift lever is in the park position, the electrical circuit is activating the electro-magnet, and the pawl is not depressed, operating the electro-magnet to create a magnetic force pressing the blocker against the ramp lever, but with the magnetic force being less than a spring force of the bias spring such that the ramp lever and the blocker remain in the under-pawl position and pawl-blocking position, respectively; and when the shift lever is in the park position, the electrical circuit is activating the electro-magnet, and the pawl is depressed, operating the electro-magnet to create the magnetic force biasing the blocker toward the pawl-unblocked position and pressing the blocker against the ramp lever, and concurrently the ramp lever is moved by the pawl, such that both the ramp lever and the blocker move to the out-from-under-pawl position and pawl-unblocked position, respectively, thus allowing the shift lever to be moved from the park position to another one of the gear positions.

* * * * *